United States Patent
Lee et al.

(10) Patent No.: US 9,213,746 B2
(45) Date of Patent: Dec. 15, 2015

(54) METHOD FOR SEARCHING FOR INFORMATION USING THE WEB AND METHOD FOR VOICE CONVERSATION USING SAME

(75) Inventors: Geun Bae Lee, Gyeongbuk (KR); Seok Hwan Kim, Gyeongbuk (KR); Kyung Duk Kim, Gyeongbuk (KR); Dong Hyeon Lee, Gyeongsangnam-do (KR); Jun Hwi Choi, Seoul (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 193 days.

(21) Appl. No.: 14/123,449

(22) PCT Filed: Jun. 4, 2012

(86) PCT No.: PCT/KR2012/004405
§ 371 (c)(1),
(2), (4) Date: Dec. 2, 2013

(87) PCT Pub. No.: WO2012/165929
PCT Pub. Date: Dec. 6, 2012

(65) Prior Publication Data
US 2014/0108389 A1    Apr. 17, 2014

(30) Foreign Application Priority Data
Jun. 2, 2011    (KR) .......................... 10-2011-0053400

(51) Int. Cl.
*G06F 17/30* (2006.01)
*G06F 17/27* (2006.01)
*G10L 13/027* (2013.01)
*G10L 15/26* (2006.01)

(52) U.S. Cl.
CPC ........ *G06F 17/3053* (2013.01); *G06F 17/2765* (2013.01); *G06F 17/2785* (2013.01); *G06F 17/3069* (2013.01); *G10L 13/027* (2013.01); *G10L 15/26* (2013.01)

(58) Field of Classification Search
CPC ................................. G06F 17/30; G10L 13/00
USPC ................. 707/600–899; 704/1–10, 200–278
See application file for complete search history.

(56) References Cited

U.S. PATENT DOCUMENTS 8,630,860 B1 * 1/2014 Zhang et al. ................... 704/275
2007/0299838 A1 * 12/2007 Behrens et al. .................... 707/5
2011/0060592 A1 * 3/2011 Kang et al. ..................... 704/275

FOREIGN PATENT DOCUMENTS

KR    10-2002-0086043 A    11/2002
KR    10-2007-0102035 A    10/2007
KR       10-0862583 B1    10/2008
KR    10-2009-0066106 A     6/2009

OTHER PUBLICATIONS

International Search Report for corresponding International Application No. PCT/KR2012/004405, mailed Nov. 7, 2012 (4 pages).

* cited by examiner

*Primary Examiner* — Isaac M Woo
(74) *Attorney, Agent, or Firm* — Osha Liang LLP

(57) ABSTRACT

According to the present invention, a method for searching for information using the Web and a method for voice conversation using same involve generating a basic word vector for at least one of a provided user query and a language analysis result; using the basic word vector, searching a vector space database for a vector space corresponding to the basic word vector; searching, if a similarity between the basic word vector and the found vector space is lower than a preset reference, a vector space database for a vector space corresponding to an expanded word vector using the expanded word vector generated from the result of the Web search performed using at least one of the user query and the language analysis result; and searching for knowledge information on the basis of the vector space found in the basic searching step or the expanded searching step. Thus, improved research results may be provided in response to the user query.

14 Claims, 3 Drawing Sheets

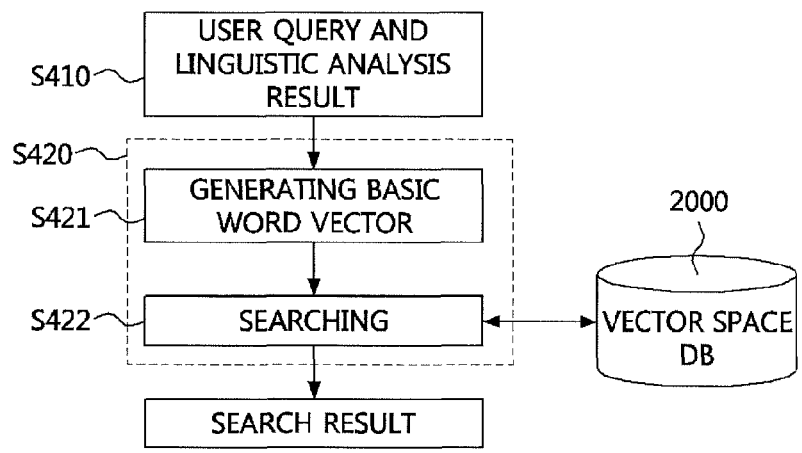
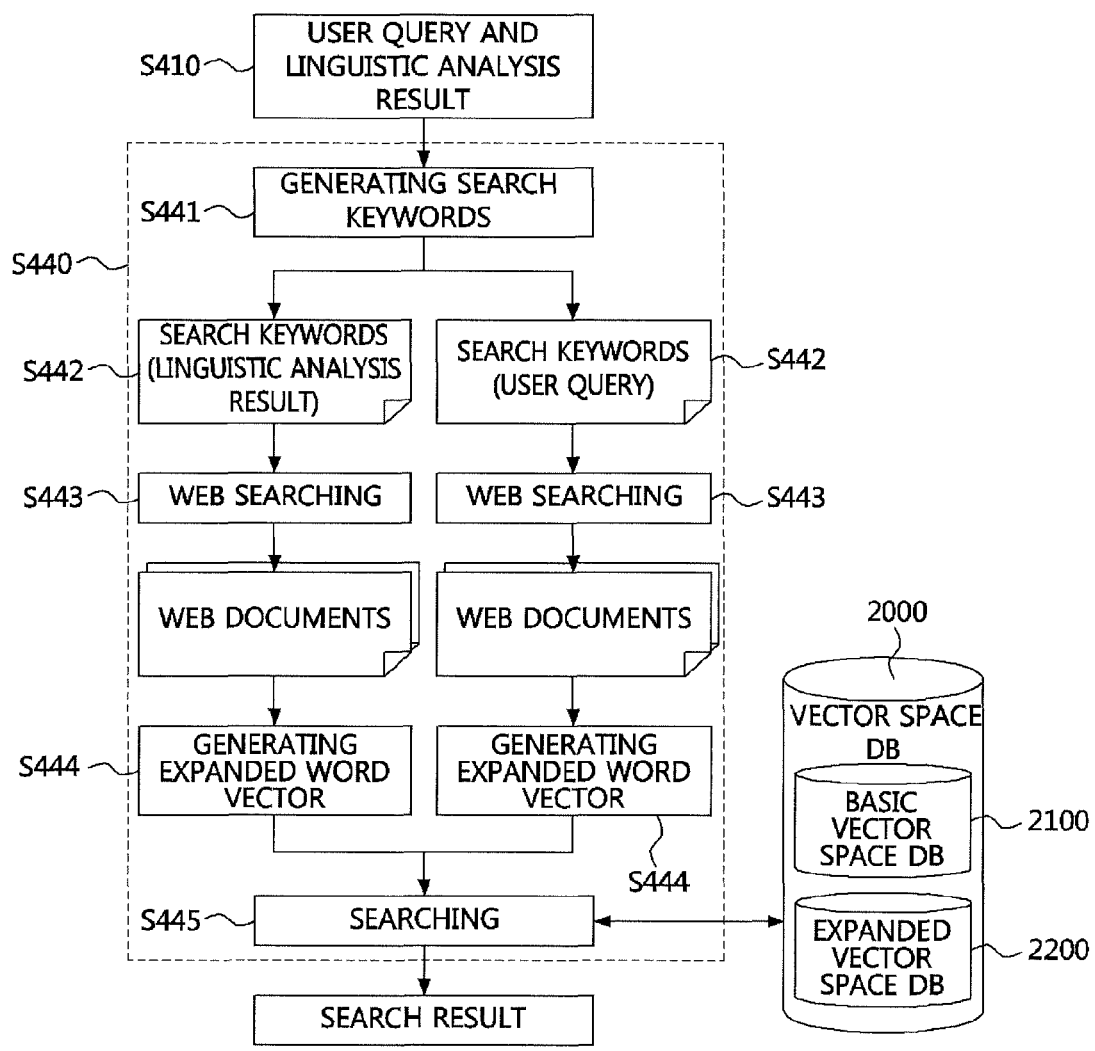

METHOD FOR SEARCHING FOR INFORMATION USING THE WEB AND METHOD FOR VOICE CONVERSATION USING SAME

TECHNICAL FIELD

Example embodiments of the present invention relate to an information search, and more specifically to a method of searching information by using web, which can efficiently perform an information search using web, and a method of spoken dialogue using the same.

BACKGROUND ART

An information search is a procedure of providing an appropriate response for a query of user based on specific knowledge and information. For example, when a query for finding a specific program is inputted to a smart television system, a response to the query may be provided to the user by accessing a knowledge information database storing a TV program through information search. However, a knowledge information database which has been used in the conventional information search methods is a relational database, and, in this case, there is a problem that appropriate information cannot be searched if a query is not provided in a format which is the same as that of information stored in the database. Also, when the query has a complicated format which needs semantic inference to be understood, there may be a problem that the appropriate response cannot be searched. For example, if we provide a query 'let's see a soccer game of Ji-Sung Park' to a smart TV system, we cannot obtain a query result 'Asian cup'. The reason of the above problem is that an article of 'Asian cup' does not include information related to 'Ji-Sung Park'. In order to perform the above query correctly, information that Ji-Sung Park is participating the Asian cup is additionally necessary. Although ontology is used as a solution to consider the above semantic matters, it is a very difficult task to construct and manage the ontology, and it is impossible to construct so many ontologies for inferring queries related to knowledge information. Also, there is a limit in reflecting information which are changing in real time.

DISCLOSURE

Technical Problem

Accordingly, example embodiments of the present invention are provided to substantially obviate one or more problems due to limitations and disadvantages of the related art.

Example embodiments of the present invention provide a method of searching information using web, which can provide a more enhanced response to a user query by searching information using web.

Example embodiments of the present invention also provide a method of spoken dialogue using a method of searching information using web which can provide a more enhanced response in voice to a user query in voice by searching information using web.

Technical Solution

In some example embodiments, a method of searching information using web may comprise generating a basic word vector about at least one of a provided user query and a linguistic analysis result, and searching a vector space corresponding to the basic word vector in a vector space database using the at least one basic word vector; determining a degree of similarity between the basic word vector and the searched vector space; generating an expanded word vector based on a web search result performed using at least one of the provided user query and the linguistic analysis result, and searching a vector space corresponding to the expanded word vector in the vector space database using the expanded word vector, when the degree of similarity is equal to or less than a threshold value; and searching knowledge information based on the searched vector spaces in the basic search step or in the expanded search step.

Here, the basic word vector, the expanded word vector and vector spaces stored in the vector space database may include at least one of words, weighting information on the words, and structural information on the words.

Here, the vector space database may further comprise a basic vector space database in which vector spaces are formed with the knowledge information and an expanded vector space database in which vector spaces are formed based on the web search result performed using the knowledge information.

Here, the searching knowledge information may further comprise calculating an expanded search score based on the expanded word vector and the searched at least one vector space, and sorting according to the expanded search score.

Also, weighting values may be adjusted according to the expanded word vector generated from the provided user query or the linguistic analysis result and vector spaces stored in the basic vector space database and the expanded vector space database in calculating the expanded search score.

Also, the weighting values may be configured to have a bigger value when the expanded word vector generated from the linguistic analysis result corresponds to a vector space stored in the basic vector space database or the expanded word vector generated from the user query corresponds to a vector space stored in the basic vector space database than when the expanded word vector generated from the linguistic analysis result corresponds to a vector space stored in the expanded vector space database or the expanded word vector generated from the user query corresponds to a vector space stored in the expanded vector space database.

Also, the weighting values may be configured to have a bigger value when the expanded word vector generated from the linguistic analysis result corresponds to a vector space stored in the basic vector space database than when the expanded word vector generated from the user query corresponds to a vector space stored in the basic vector space database, and the weighting values may be configured to have a bigger value when the expanded word vector generated from the linguistic analysis result corresponds to a vector space stored in the expanded vector space database than when the expanded word vector generated from the user query corresponds to a vector space stored in the expanded vector space database.

In other example embodiments, a method of voice conversation based on a method of searching information using web may comprise performing voice recognition on a user query provided in voice so as to convert the user query to a user query text; performing a linguistic analysis on the user query which is converted into the user query text; generating a basic word vector about at least one of the user query text and a result of the linguistic analysis, searching a vector space corresponding to the basic word vector in a vector space database using the basic word vector, determining a degree of similarity between the basic word vector and the searched vector space, generating an expanded word vector based on a web search result performed using at least one of the user query text and the result of the linguistic analysis, and searching a vector space corresponding to the expanded word vector in the vector space database using the expanded word vector, when the degree of similarity is equal to or less than a threshold value, and searching knowledge information based on the vector spaces searched correspondingly to the basic word vector or the expanded word vector; converting the knowledge information into a response corresponding to the user query; and performing voice synthesis on the response so as to convert the response to voice.

Here, the basic word vector, the expanded word vector and vector spaces stored in the vector space database may include at least one of words, weighting information on the words, and structural information on the words.

Here, the vector space database may further comprise a basic vector space database in which vector spaces are formed with the knowledge information and an expanded vector space database in which vector spaces are formed based on the web search result performed using the knowledge information.

Here, the searching knowledge information may further comprise calculating an expanded search score based on the expanded word vector and the searched vector space, and sorting according to the expanded search score.

Also, weighting values may be adjusted according to the expanded word vector generated from the provided user query or the linguistic analysis result and the vector space stored in the basic vector space database and the expanded vector space database in calculating the expanded search score.

Also, the weighting values may be configured to have a bigger value when the expanded word vector generated from the linguistic analysis result corresponds to a vector space stored in the basic vector space database or the expanded word vector generated from the user query corresponds to a vector space stored in the basic vector space database than when the expanded word vector generated from the linguistic analysis result corresponds to a vector space stored in the expanded vector space database or the expanded word vector generated from the user query corresponds to a vector space stored in the expanded vector space database.

Also, the weighting values may be configured to have a bigger value when the expanded word vector generated from the linguistic analysis result corresponds to a vector space stored in the basic vector space database than when the expanded word vector generated from the user query corresponds to a vector space stored in the basic vector space database, and the weighting values may be configured to have a bigger value when the expanded word vector generated from the linguistic analysis result corresponds to a vector space stored in the expanded vector space database than when the expanded word vector generated from the user query corresponds to a vector space stored in the expanded vector space database.

Advantageous Effects

In the above described method of searching information using web and method of spoken dialogue according to the present invention, better search results to a user query may be provided by extending knowledge information and information on user query through web searching.

Also, since information searching is performed through web, human processes may not be necessary, the conventional vector space models may be used. A large amount of recent information such as question/answer Q&A information and social network information may be reflected in information searching, and thereby there may be a strongpoint in that it becomes possible to perform functions of inference and recommendation.

DESCRIPTION OF DRAWINGS

FIG. 3 is a flow chart of a basic search procedure of a method of searching information using web according to an example embodiment of the present invention;

FIG. 4 is a flow chart of an expanded search procedure of a method of searching information using web according to an example embodiment of the present invention.

MODES OF THE INVENTION

Figure 1:
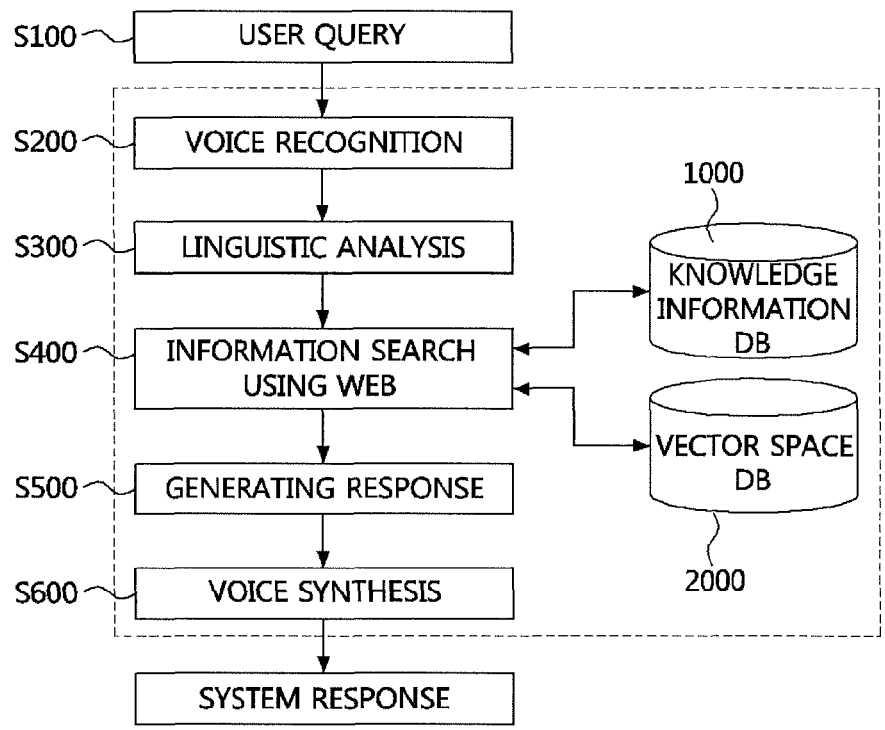
FIG. 1 is a flow chart to show a method of spoken dialogue using a method of searching information using web according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, in embodiments of the present invention, a method of searching information using web and a method of spoken dialogue using the same may be implemented as a system comprising at least one server, and the system may comprise at least one server and a plurality of user terminals.

Hereinafter, in embodiments of the present invention, a system performing the method of searching information using web and the method of spoken dialogue using the same may be referred as an 'information search system'.

The server and the user terminals may be directly connected to each other, or may be connected through at least one wireless or wired communication network. Also, the above server may be a web server, and the user terminal may be one of various terminal apparatuses having a function of communicating with the server and a function of information processing, such as a Portable Multimedia Player (PMP), a notebook (laptop) computer, a smart phone, a smart TV and so on.

FIG. 1 is a flow chart to show a method of spoken dialogue using a method of searching information using web according to an example embodiment of the present invention.

Referring to FIG. 1, the method of spoken dialogue using a method of searching information using web may include a step S100 of being provided with a user query in voice; a step S200 of voice-recognizing converting the user query provided in voice into a user query text; a step S300 of performing a linguistic analysis on the user query which is converted into the user query text; a step S400 of information search performing information search using web based on at least one of the user query and a result of the linguistic analysis; a step S500 of generating a response corresponding to the user query by converting the result searched in the step S400 into the response; and a step S600 of performing voice synthesis on the response so as to convert the response to voice.

Hereinafter, the step S400 of performing information search using web will be explained in detail.

Figure 2:
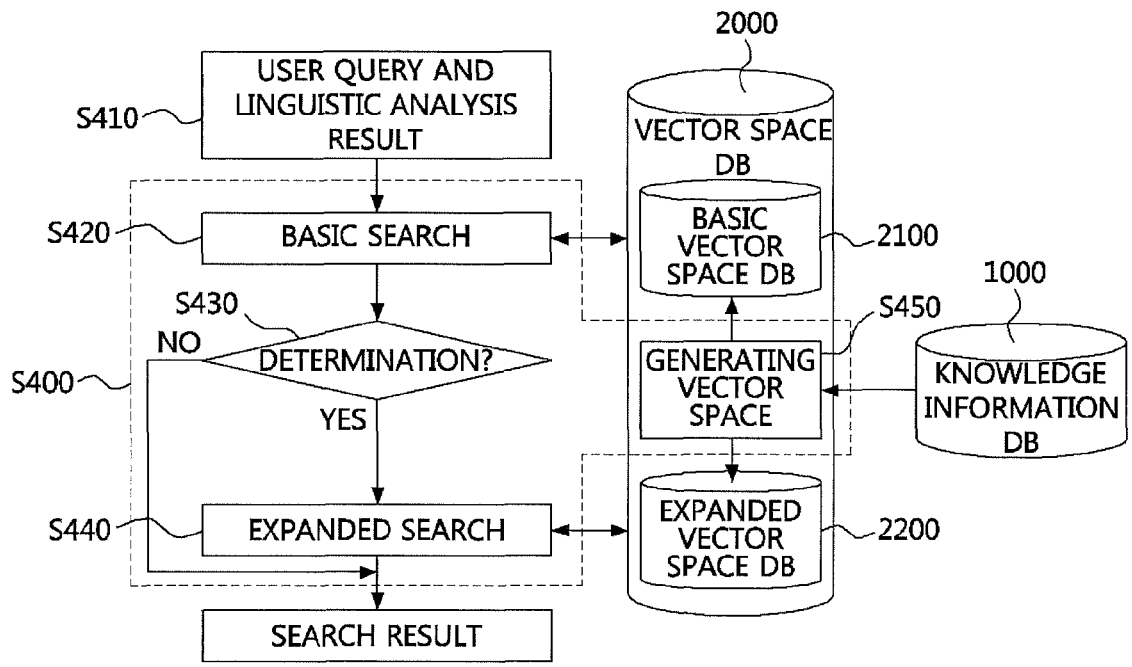
FIG. 2 is a flow chart to show a method of searching information using web according to an example embodiment of the present invention.
Figure 5:
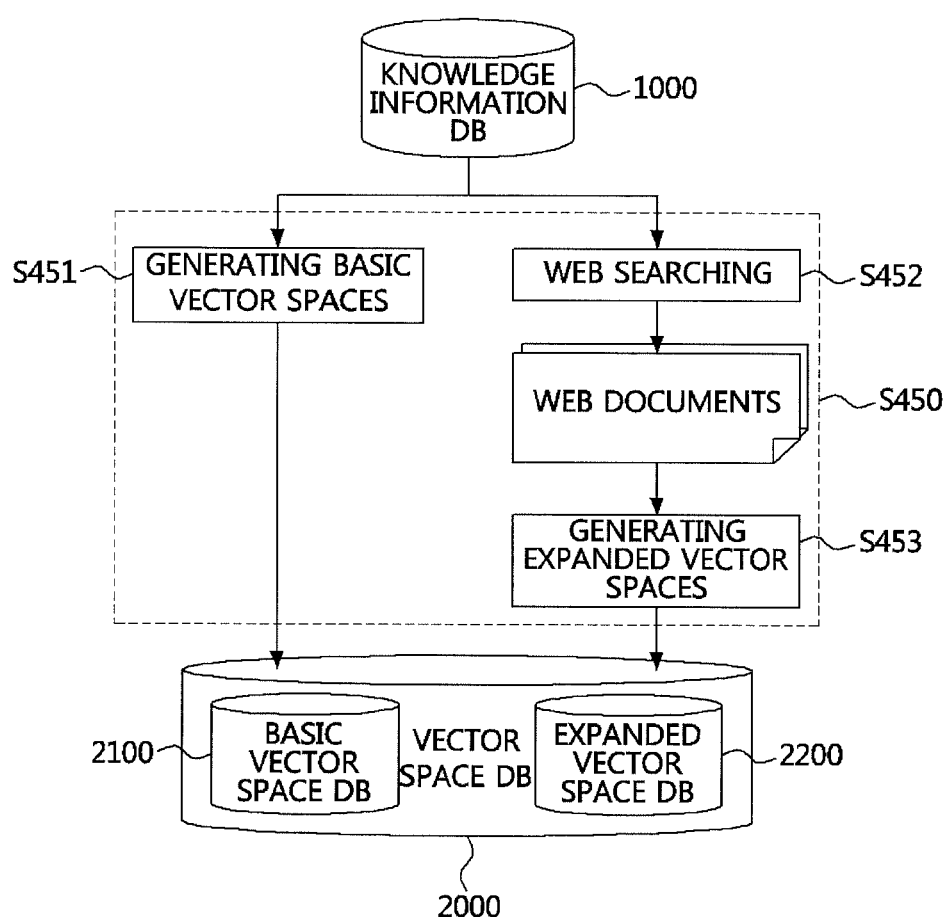
FIG. 5 is a flow chart to show a procedure of constructing a vector space database of a method of searching information using web according to an example embodiment of the present invention.

FIG. 2 is a flow chart to show a method of searching information using web according to an example embodiment of the present invention, FIG. 3 is a flow chart of a basic search procedure of a method of searching information using web according to an example embodiment of the present invention, FIG. 4 is a flow chart of an expanded search procedure of a method of searching information using web according to an example embodiment of the present invention, and FIG. 5 is a flow chart to show a procedure of constructing a vector space database for a method of searching information using web according to an example embodiment of the present invention.

Referring to FIG. 2 to FIG. 5, the method of searching information using web S400 may provide a response to a user query by searching knowledge information stored in a knowledge information database 1000 based on at least one of the user query and a result of linguistic analysis on the user query.

The linguistic analysis may be one of various linguistic analysis techniques such as morpheme analysis, sentence structure analysis, and semantic analysis.

The result of the linguistic analysis may comprise a dialog act, a main act, and structural information. The dialog act may not be always matched to a sentence format of the user query, but may generally represent sentence type—a declarative sentence, an interrogative sentence, or a request sentence. The main act may mean sematic information representing an action desired by the user, such as turn on/off TV, finding a program. The structural information may mean information on names of entities which are represented in the user query, for example, a genre of the program, a title of the program, a name of channel, a starting time of the program, actors of the program. Also, the user query may be a text-type locution (utterance or speech) or a user query text which locution inputted in voice is converted into.

Referring to FIG. 2, at least one of a user query and a result of linguistic analysis may be provided in a method of searching information using web at S410.

Basic word vectors may be generated based on at least one of the provided user query and the linguistic analysis result, and a basic search may be performed to search vector spaces corresponding to the basic word vectors in a vector space database 2000 at S420.

In the vector space database 2000, where a search result corresponding to the basic word vectors exists or not, or whether a basic search score is equal to or less than a preconfigured threshold score may be determined at S430. The threshold score may be configured variously according to system design.

According to a result of the determination, an expanded search may be performed as S440 when the search result corresponding to the basic word vectors does not exist in the vector space database 2000 or the basic search score is equal to or less than the preconfigured threshold score.

In the above expanded search performed at S440, vector spaces corresponding to expanded word vectors may be searched in the vector space database 2000 by performing web searching using search keywords generated based on at least one of the user query and the linguistic analysis result, and generating the expanded word vectors corresponding to the searched web documents.

Knowledge information stored in the knowledge information database 1000, which is corresponding to the vector space searched in the above basic search and the expanded search may be outputted as search result.

Also, the method of searching information using web S400 may further comprise generating vector spaces corresponding to knowledge information stored in the knowledge information database 1000 and storing the generated vector spaces to the vector space database 2000, S450.

Here, the step of generating vector spaces corresponding to knowledge information may be preferably performed before the steps of the basic search and the expanded search. However, an operational sequence of the above steps may not be limited to the above case. That is, the step of generating vector spaces corresponding to knowledge information may be performed any time independently of the steps S410 to S440.

The basic word vectors may mean vector spaces corresponding to at least one of the user query and a result of linguistic analysis on the user query, and the expanded word vectors may mean vector spaces corresponding to words included in web documents searched through a web searching using search keywords generated as related to at least one of the user query and the linguistic analysis result.

Also, the 'word' in this specification may be a single word, a keyword, or a phrase. The meaning of 'word' may be made differently according to an application domain which the present invention is applied to.

The step S410 of being provided with the user query and the result of linguistic analysis may mean a procedure of being provided with the user query in text format and the result which may include the dialog act, the main act, and the structural information as described above.

Referring to FIG. 3, the step S420 of the basic search may further comprise a step S421 of generating the basic word vector corresponding to at least one of the user query and the result of linguistic analysis, and a step S422 of searching the vector spaces corresponding to the basic word vectors in the vector space database 2000. The basic word vectors may mean vector spaces formed by using at least one of the user query and the linguistic analysis result.

In the step S430 of determination, a function of determining whether vector spaces corresponding to the basic word vectors exist in the vector space database 2000 or not and whether the basic search score is equal to or less than the preconfigured threshold score or not may be performed. Also, the expanded search has a later response time than that of the basic search since the expanded search performs search using web, and so the step S430 may perform a function of determining whether the only basic search can be performed or not if possible. The basic search score may mean a numerical value representing a degree of correspondence between the basic word vector and a vector space stored in the vector space database 2000, and may be calculated by using various calculation methods such as a cosine similarity. For example, the cosine similarity may be derived by below equation 1.

$$s = \frac{A \cdot B}{\|A\|\|B\|} \quad \text{[Equation 1]}$$

In the above equation 1, S means a cosine similarity, A and B mean vector spaces, and $\|A\|$ and $\|B\|$ mean absolute values of the vector spaces.

Also, weighting values adjusted according to whether the structural information of the basic word vector shown in the linguistic analysis result and a vector space stored in the vector space database 2000 are the same or not may be applied to the calculation.

For example, a user query is assumed to be "Watch an Asian Cup soccer". When a result of linguistic analysis on the user query is "TITLE: Asian Cup, Soccer", the basic word vector may be generated as <(TITLE: Asian Cup, 0.5)>, <(TITLE: Soccer, 0.5>. Also, when it is assumed that fields of vector spaces stored in the vector space database 2000 is <TITLE: Asian cup, 0.2>, <(CATEGORY: Soccer, 0.3>, a basic search score may be calculated as (0.5×0.2+0.5×0.3)/(0.707+0.361)=0.234 if the cosine similarity is used for calculation of the score. However, if weighting values are used as 0.7 (for the case of the same structural information) and 0.3 (for the case of different structural information), the basic search score considering the above structural information may be (0.5×0.2'0.7+0.5×0.3×0.3)/(0.707+0.361)=0.108.

The step S440 of the expanded search may be performed when vector spaces corresponding to the basic word vectors do not exist in the vector space database 2000 or the basic search score is equal to or below a preconfigured threshold. The step S440 may further comprise a step S441 of generating search keywords related to at least one of the user query and the linguistic analysis result, a step S443 of performing web searching, a step S444 of generating expanded word vectors corresponding to searched web documents, and a step S445 of searching vector spaces corresponding to the expanded word vectors among vector spaces stored in the vector space database 2000. For the search keywords, at least one of important fields of the user query and the linguistic analysis result may be used, and the above fields used for search keywords may be determined based on which field is a field that users have searched frequently or which field has a representative nature, or may be determined heuristically. Here, the reason why the user query is considered in generating the search keywords is for considering cases in that important words are not represented in the linguistic analysis result. For example, when a user query is assumed to be "Watch a funny Movie", even though "funny" is an important word, "funny" may not be represented in linguistic analysis result of the query.

A web searching using the search keywords may be performed at S443, and the expanded word vectors corresponding web documents searched through the web searching may be generated as S444. The expanded word vectors may mean vector spaces generated as corresponding to respective word included in the searched web documents. The vector spaces corresponding to the expanded word vectors may be searched among vector spaces stored in the vector space database 2000 by using the expanded vector space. The determination on which vector spaces correspond to the expanded word vectors is performed based on whether an expanded search score is equal to or above a preconfigured threshold, and the searched vector spaces may be sorted in ascending order of expanded search score for each searched vector space.

The expanded search score may be calculated as a degree of similarity between the expanded word vector and a vector space stored in the vector space database 2000, and weighting values adjusted differently according to generation manners of the expanded word vectors and vector spaces stored in the vector space database may be applied to the calculation.

Specifically, the expanded search score may be derived by below equation 2.

$$\text{score}(q, t_i) = \sum_{k \in \{1,2\}} \alpha_k \cdot f(\vec{q_k^l}, \vec{t_i^l}) + \sum_{k \in \{1,2\}} \beta_k \cdot f(\vec{q_k^w}, \vec{t_i^w}) \quad \text{[Equation 2]}$$

In the above equation 2, $\vec{q_1^l}$ means the basic word vector generated through linguistic analysis before web searching, $\vec{q_2^l}$ means the basic word vector generated based on user query before web searching, $\vec{q_1^w}$ means the expanded word vector generated through linguistic analysis after web searching, and $\vec{q_2^w}$ means the expanded word vector generated based on user query after web searching.

Also, $\vec{t_i^l}$ means vector spaces stored in the basic vector space database 2100 corresponding to each field of knowledge information stored in the knowledge information database 1000, $\vec{t_i^w}$ means word vector corresponding to each field of documents searched in the expanded vector space database 2200.

Also, $\alpha_1$ may be a weighting value in the case that the expanded word vector generated based on the linguistic analysis result corresponds to a vector space stored in the basic vector space database 2100, and $\alpha_2$ may be a weighting value in the case that the expanded word vector generated based on the user query corresponds to a vector space stored in the basic vector space database 2100. Also, $\beta_1$ may be a weighting value in the case that the expanded word vector generated based on the linguistic analysis result corresponds to a vector space stored in the expanded vector space database 2200, and $\beta_2$ may be a weighting value in the case that the expanded word vector generated based on the user query corresponds to a vector space stored in the expanded vector space database 2200. The above weighting values may be changed and configured according to generation manners of expanded word vectors and vector spaces of the vector space database.

For example, since we can suppose that reliabilities of vector spaces, which are generated not through web searching, stored in the basic vector space database 2100 may be better than those of vector spaces, which are generated through web searching, stored in the expanded vector space database 2200, $\alpha_1$ and $\alpha_2$ may be configured to have larger values than $\beta_1$ and $\beta_2$.

Also, since we can suppose keywords from linguistic analysis on a user query are more important than those from the user query, $\alpha_1$ may be configured to have a bigger value than $\alpha_2$, and $\beta_1$ may be configured to have a bigger value than $\beta_2$.

The step S450 of generating vector spaces and storing the generated vector spaces in the vector space database 2000 may further include a step s451 of storing basic vector spaces which are formed from knowledge information stored in the knowledge information database 1000 to the vector space base database 2100, a step S452 of extracting keywords from knowledge information stored in the knowledge information database 1000 and performing web searching using the keywords, and a step S453 of forming expanded vector spaces from web documents searched and storing the expanded vector spaces in the expanded vector space database 2200.

The basic vector spaces may include vector spaces and structural information generated in advance as corresponding to each word of documents stored in the knowledge information database 1000.

For example, when it is supposed that a document titled as "Ji-Sung Park Manchester United Game" is stored with an entry ID of 10 in the knowledge information database 1000, basic vector spaces <Ji-Sung Park, 10, 0.3>, <Manchester, 10, 0.2>, <United, 10, 0.1>, and <Game, 10, 0.1> may be stored in the basic vector space database 2100. Here, 'Ji-Sung park' mean a word, '10' means an ID of entry in which the word is stored, and '0.3' means a weighting value on the word. The structural information may mean a category to which the word belongs, for example, the structural information may be a title of column in the knowledge information database 1000, and a name of entity in result of linguistic analysis on user query. Also, the structural information may be used as additional information for the basic search score used in the step S420 of basic search.

For example, a bigger weighting value may be used when specific information such as information on 'cast' is searched in the knowledge information database 1000 and the specific information such as information on 'cast' is searched in linguistic analysis result.

The weighting values corresponding to each word of knowledge information stored in the knowledge information database 1000 may be calculated as below equation 3, a multiplication operation of a term frequency (TF) and an inverse document frequency (IDF).

$$tf_{i,j} = \frac{n_{i,j}}{\sum_k n_{k,j}}, \quad \text{[Equation 3]}$$

$$idf_i = \log \frac{|D|}{|\{d_j : t_i \in d_j\}|},$$

$$tfidf_{i,j} = tf_{i,j} \cdot idf_i$$

In the equation 3, a term frequency ($tf_{i,j}$) may be calculated by dividing the number of appearances of a specific word ($n_{i,j}$) in a document ($d_j$) by the total number of words $\left(\sum_k n_{k,i}\right)$ in the document ($d_j$). An inverse document frequency ($idf_i$) may be obtained as a logarithmic value of the total number of documents ($|D|$) divided by the number of documents in which the word appears ($|\{d_j : t_i \in d_j\}|$).

The expanded vector space database 2200 may be constructed by a step S452 of extracting keywords from knowledge information stored in the knowledge information database 1000, a step S453 of forming expanded vector spaces corresponding to each word of the searched web documents.

For the keywords, important fields of knowledge information stored in the knowledge information database 1000 may be used, and the above fields used as the keywords may be determined based on which field is a field that users have searched frequently or which field has a representative nature, or may be determined heuristically.

For example, in the case of TV program schedule, 'title of program' may be important field used for the keyword. For example, in the case of book searching, 'title of book' may be important field used for the keyword. Since web documents may include information which is not stored in the knowledge information database 1000, the web documents may supplement the knowledge information database 1000. For example, information on 'Asian Cup' stored in the knowledge information database may be expanded by obtaining additional information on 'Kwang-Rae Jo' and 'Ji-Sung Park' through web searching.

In the above described method of searching information using web and method of spoken dialogue according to the present invention, better search results to a user query may be provided by extending knowledge information and information on user query through web searching.

Also, since information searching is performed through web, human processes may not be necessary, the conventional vector space models may be used. A large amount of recent information such as question/answer Q&A information and social network information may be reflected in information searching, and thereby there may be a strongpoint in that it becomes possible to perform functions of inference and recommendation.

While the example embodiments of the present invention and their advantages have been described in detail, it should be understood that various changes, substitutions and alterations may be made herein without departing from the scope of the invention.

The invention claimed is:

1. A method of searching information using web, comprising:
   generating a basic word vector about at least one of a provided user query and a linguistic analysis result, and searching a vector space corresponding to the basic word vector in a vector space database using the at least one basic word vector;
   determining a degree of similarity between the basic word vector and the searched vector space;
   generating an expanded word vector based on a web search result performed using at least one of the provided user query and the linguistic analysis result, and searching a vector space corresponding to the expanded word vector in the vector space database using the expanded word vector, when the degree of similarity is equal to or less than a threshold value; and searching knowledge information based on the searched vector spaces in the basic search step or in the expanded search step.

2. The method of claim 1, wherein the basic word vector, the expanded word vector and vector spaces stored in the vector space database include at least one of words, weighting information on the words, and structural information on the words.

3. The method of claim 1, wherein the vector space database further comprises a basic vector space database in which vector spaces are formed with the knowledge information and an expanded vector space database in which vector spaces are formed based on the web search result performed using the knowledge information.

4. The method of claim 1, wherein the searching knowledge information further comprises calculating an expanded search score based on the expanded word vector and the searched at least one vector space, and sorting according to the expanded search score.

5. The method of claim 4, wherein weighting values are adjusted according to the expanded word vector generated from the provided user query or the linguistic analysis result and the vector space stored in the basic vector space database and the expanded vector space database in calculating the expanded search score.

6. The method of claim 5, wherein the weighting values are configured to have a bigger value when the expanded word vector generated from the linguistic analysis result corresponds to a vector space stored in the basic vector space database or the expanded word vector generated from the user query corresponds to a vector space stored in the basic vector space database than when the expanded word vector generated from the linguistic analysis result corresponds to a vector space stored in the expanded vector space database or the expanded word vector generated from the user query corresponds to a vector space stored in the expanded vector space database.

7. The method of claim 5,
wherein the weighting values are configured to have a bigger value when the expanded word vector generated from the linguistic analysis result corresponds to a vector space stored in the basic vector space database than when the expanded word vector generated from the user query corresponds to a vector space stored in the basic vector space database,
wherein the weighting values are configured to have a bigger value when the expanded word vector generated from the linguistic analysis result corresponds to a vector space stored in the expanded vector space database than when the expanded word vector generated from the user query corresponds to a vector space stored in the expanded vector space database.

8. A method of voice conversation based on a method of searching information using web, comprising:
performing voice recognition on a user query provided in voice so as to convert the user query to a user query text;
performing a linguistic analysis on the user query which is converted into the user query text;
generating a basic word vector about at least one of the user query text and a result of the linguistic analysis, searching a vector space corresponding to the basic word vector in a vector space database using the basic word vector, determining a degree of similarity between the basic word vector and the searched vector space, generating an expanded word vector based on a web search result performed using at least one of the user query text and the result of the linguistic analysis, and searching a vector space corresponding to the expanded word vector in the vector space database using the expanded word vector, when the degree of similarity is equal to or less than a threshold value, and searching knowledge information based on the vector spaces searched correspondingly to the basic word vector or the expanded word vector;
converting the knowledge information into a response corresponding to the user query; and
performing voice synthesis on the response so as to convert the response to voice.

9. The method of claim 8, wherein the basic word vector, the expanded word vector and vector spaces stored in the vector space database include at least one of words, weighting information on the words, and structural information on the words.

10. The method of claim 9, wherein weighting values are adjusted according to the expanded word vector generated from the provided user query or the linguistic analysis result and the vector space stored in the basic vector space database and the expanded vector space database in calculating the expanded search score.

11. The method of claim 10, wherein the weighting values are configured to have a bigger value when the expanded word vector generated from the linguistic analysis result corresponds to a vector space stored in the basic vector space database or the expanded word vector generated from the user query corresponds to a vector space stored in the basic vector space database than when the expanded word vector generated from the linguistic analysis result corresponds to a vector space stored in the expanded vector space database or the expanded word vector generated from the user query corresponds to a vector space stored in the expanded vector space database.

12. The method of claim 10,
wherein the weighting values are configured to have a bigger value when the expanded word vector generated from the linguistic analysis result corresponds to a vector space stored in the basic vector space database than when the expanded word vector generated from the user query corresponds to a vector space stored in the basic vector space database,
wherein the weighting values are configured to have a bigger value when the expanded word vector generated from the linguistic analysis result corresponds to a vector space stored in the expanded vector space database than when the expanded word vector generated from the user query corresponds to a vector space stored in the expanded vector space database.

13. The method of claim 8, wherein the vector space database further comprises a basic vector space database in which vector spaces are formed with the knowledge information and an expanded vector space database in which vector spaces are formed based on the web search result performed using the knowledge information.

14. The method of claim 8, wherein the searching knowledge information further comprises calculating an expanded search score based on the expanded word vector and the searched vector space, and sorting according to the expanded search score.

* * * * *